(No Model.)

L. K. STRANG.
FRUIT EXTRACTOR.

No. 344,506. Patented June 29, 1886.

WITNESSES.
Fred. B. Dolan
J. M. Dolan

INVENTOR.
Lew K. Strang
by his attys
Crosby & Raymond.

N. PETERS. Photo-Lithographer, Washington, D. C.

UNITED STATES PATENT OFFICE.

LEW K. STRANG, OF GLOUCESTER, MASSACHUSETTS.

FRUIT-EXTRACTOR.

SPECIFICATION forming part of Letters Patent No. 344,506, dated June 29, 1886.

Application filed October 9, 1885. Serial No. 179,393. (No model.)

*To all whom it may concern:*

Be it known that I, LEW K. STRANG, of Gloucester, in the county of Essex and State of Massachusetts, a citizen of the United States, have invented a new and useful Improvement in Fruit-Extractors, of which the following is a full, clear, and exact description, reference being had to the accompanying drawings, forming a part of this specification, in explaining its nature.

The object of the invention is to provide a device for extracting the interior substance of lemons and other fruit from the peel or skin; and it comprises an extracting device mounted above a cup and attached thereto in such a manner that the cup shall be used as a handle in operating the extractor or device in the lemon or other fruit, shall act as a support therefor, and shall receive the juice and substance extracted from the interior of the fruit.

Figure 1:
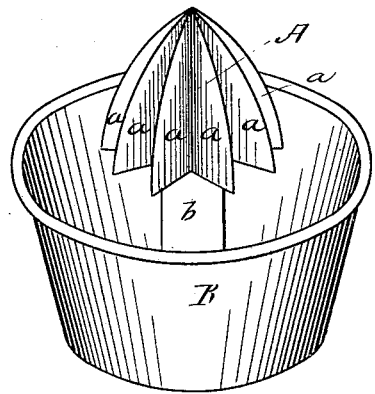
Figure 2:
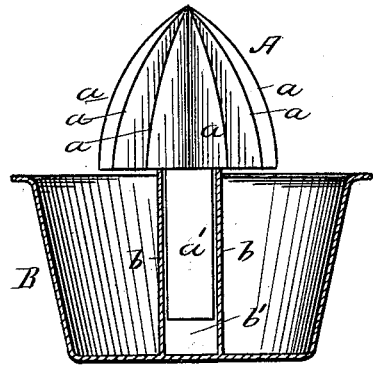
Figure 3:
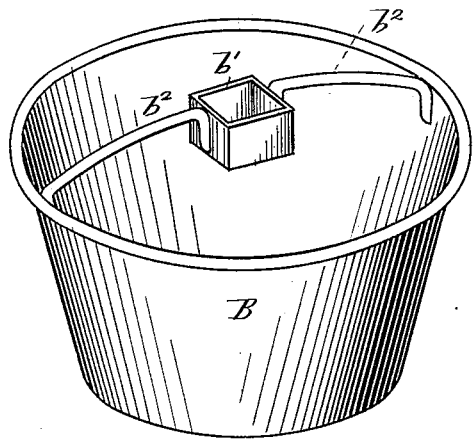
Figure 4:
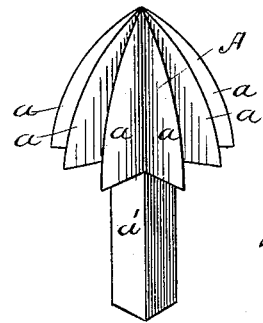

Referring to the drawings, Figure 1 is a perspective view of my improved device. Fig. 2 is a view part in vertical section and part in side elevation. Fig. 3 shows a slight modification. Fig. 4 is a perspective view of the extractor.

A represents the extractor. It preferably is shaped and formed as represented in Figs. 2 and 4, and its flanges or ribs $a$ may extend radially therefrom, as represented, or bear any other relation thereto. It has a post, $a'$, by which it is secured in place. It preferably is made of cast-iron galvanized; but it may be made of any other suitable metal suitably treated, or glass, earthenware, iron, or any other substance.

B is the cup, and it preferably is made of tin, although it may be made of other sheet metal, or glass, or earthenware. It has projecting upward, for smaller sizes, the socket or post $b$, which has a hole, $b'$, which receives the spindle $a'$ of the extractor; but for larger sizes I prefer a wire or metal frame, $b^2$, which extends across the top of the cup, is fastened at either side, either permanently or not, as may be desired, to the rim or side thereof, and which has the hole $b'$ for the reception of the spindle or post of the extractor.

Of course I do not confine myself to the means of attaching the extractor to the cup, as I may employ any other device for accomplishing this purpose.

I prefer that the extractor be removable, in order to facilitate its washing and cleansing, and also that of the cup.

In operation, the lemon or other fruit is placed upon the extractor, and the extractor turned in relation to it, or it turned upon the extractor, and the interior substance thereof is bored or cut out and falls into the cup.

Having thus fully described my invention, I claim and desire to secure by Letters Patent of the United States—

1. A fruit-extractor comprising the cup B and the extracting device A, fastened directly to the cup in a manner to be turned or revolved therewith, and in a position over the opening thereof, whereby it is adapted to be turned when the cup is turned, and the cup is arranged to receive the juice and other substance extracted, all substantially as described.

2. A cup, B, having a socket, $b'$, with the removable extractor A, having the post or spindle $a'$, shaped to fit the socket $b'$, all substantially as described.

LEW K. STRANG.

Witnesses:
FRANK E. SMOTHER,
CYRUS STORY.